US006168675B1

(12) United States Patent
Fang et al.

(10) Patent No.: US 6,168,675 B1
(45) Date of Patent: Jan. 2, 2001

(54) ALUMINUM-SILICON ALLOY FOR HIGH TEMPERATURE CAST COMPONENTS

(75) Inventors: Que-Tsang Fang, Export, PA (US); James R. Van Wert, Franklin, OH (US)

(73) Assignee: Alcoa Inc., Pittsburgh, PA (US)

( * ) Notice: Under 35 U.S.C. 154(b), the term of this patent shall be extended for 0 days.

(21) Appl. No.: 09/211,556

(22) Filed: Dec. 15, 1998

Related U.S. Application Data
(60) Provisional application No. 60/069,456, filed on Dec. 15, 1997.

(51) Int. Cl.$^7$ .......................... C22C 21/06; F16D 65/10
(52) U.S. Cl. .......................... 148/440; 420/542; 420/543; 420/546
(58) Field of Search ..................... 188/218 XL; 148/440; 420/542, 543, 546

(56) References Cited

U.S. PATENT DOCUMENTS

| | | | |
|---|---|---|---|
| 1,799,837 | 4/1931 | Archer et al. | |
| 2,026,544 | 1/1936 | Kempf et al. | 75/1 |
| 2,026,567 | 1/1936 | Kempf et al. | 75/1 |
| 2,026,568 | 1/1936 | Kempf et al. | 75/1 |
| 2,026,569 | 1/1936 | Kempf et al. | 75/1 |
| 2,026,570 | 1/1936 | Kempf et al. | 75/1 |
| 2,026,571 | 1/1936 | Kempf et al. | 75/1 |
| 2,026,572 | 1/1936 | Kempf et al. | 75/1 |
| 3,306,738 | 2/1967 | Young et al. | 75/143 |
| 3,392,015 | 7/1968 | Badia | 75/147 |
| 3,726,672 | 4/1973 | Lindberg et al. | 75/142 |
| 4,147,074 | 4/1979 | Noguchi et al. | 74/559 |
| 4,290,510 * | 9/1981 | Warren | 188/218 XL |
| 4,464,442 | 8/1984 | McDonald et al. | 428/654 |
| 4,702,885 | 10/1987 | Odani et al. | 419/23 |
| 4,785,092 | 11/1988 | Nanba et al. | 420/540 |
| 5,141,703 | 8/1992 | Schmid et al. | 420/402 |
| 5,234,514 | 8/1993 | Donahue et al. | 148/549 |
| 5,415,709 | 5/1995 | Kita | 148/437 |
| 5,484,492 * | 1/1996 | Rogers et al. | 148/437 |
| 5,494,540 | 2/1996 | Ochi et al. | 148/552 |
| 5,523,050 | 6/1996 | Lloyd et al. | 420/528 |
| 5,582,659 | 12/1996 | Hashimoto et al. | 148/549 |
| 5,603,783 | 2/1997 | Ferreira | 148/549 |

FOREIGN PATENT DOCUMENTS

| | | |
|---|---|---|
| 2030928 | 5/1992 | (CA) . |
| 56-038667 | 9/1981 | (JP) . |
| 01-319646 | 12/1989 | (JP) . |
| 6-306521 * | 11/1994 | (JP) . |
| 7-090459 * | 4/1995 | (JP) . |
| 7-252569 * | 10/1995 | (JP) . |
| 9-272939 * | 10/1997 | (JP) . |

\* cited by examiner

*Primary Examiner*—Sikyin Ip
(74) *Attorney, Agent, or Firm*—Gary P. Topolosky

(57) ABSTRACT

There is claimed an aluminum alloy composition consisting essentially of: about 12–22 wt % silicon, about 2.5–4.5 wt % nickel, about 0.2–0.6 wt % magnesium, up to about 1.2 wt % manganese, up to about 1.2 wt % iron, and about 0.005–0.015 wt % phosphorus. This alloy composition may further contain up to about 0.25 wt % vanadium, up to about 0.2 wt % zirconium, up to about 0.25 wt % titanium, up to about 2 wt % cerium and/or mischmetal. Because of its high temperature strengths, said alloy is suitable for manufacturing into various cast automotive components, including vehicle disk brake frames and other parts.

18 Claims, No Drawings

ALUMINUM-SILICON ALLOY FOR HIGH TEMPERATURE CAST COMPONENTS

CROSS REFERENCE TO RELATED APPLICATIONS

This application claims the benefit of U.S. Provisional Application Serial No. 60/069,456, filed on Dec. 15, 1997, the disclosure of which is fully incorporated by reference herein.

BACKGROUND OF THE INVENTION

This invention provides an improved substantially copper-free, lithium-free aluminum casting alloy suitable for use in vehicular brake applications, particularly automotive disk brake assemblies. This new casting alloy retains significant strength at high temperatures, up to about 900° F.

Several aluminum-high silicon alloys have been patented over the years, some with known high temperature end uses. These include: U.S. Pat. Nos. 1,799,837, 2,026,544, 2,026,567, 2,026,568, 2,026,569, 2,026,570, 2,026,571, 2,026,572, 3,306,738, 3,392,015, 3,726,672, 4,147,074, 4,464,442, 4,702,885, 4,785,092, 5,141,703, 5,234,514, 5,415,709, 5,494,540, 5,523,050 and 5,603,783, as well as Canadian Patent No. 2,030,928 and Japanese Patent Nos. 81/38,667, and 01/319,646. In U.S. Pat. No. 5,582,659, there are phosphorus additions to much lower silicon, aluminum alloys.

It is a main objective of this invention to provide an aluminum alloy ideally suited for high temperature, high surface abrasion applications like the ones described above.

SUMMARY OF THE INVENTION

The above objectives of this invention are achieved by way of an alloy composition consisting essentially of: about 12–22 wt % silicon, about 2.5–4.5 wt % nickel, about 0.2–0.6 wt % magnesium, up to about 1.2 wt % manganese, up to about 1.2 wt % iron, and about 0.005–0.015 wt % phosphorus. This alloy composition will also tolerate up to about 0.25 wt % vanadium, up to about 0.2 wt % zirconium, up to about 0.25 wt % titanium and, depending on the intended end use for said casting, up to about 2 wt % cerium and/or mischmetal, the balance aluminum, incidental elements and impurities.

DETAILED DESCRIPTION OF PREFERRED EMBODIMENTS

Unless indicated otherwise, all composition percentages set forth herein are by weight. And when referring to any numerical range of values herein, such ranges are understood to include each and every number and/or fraction between the stated range minimum and maximum. A range of about 12 to 22 wt % silicon, for example, would expressly include all intermediate values of about 12.1, 12.2, 12.3 and 12.5%, all the way up to and including 21.95, 21.97 and 21.99% Si. The same applies to each other numerical property and/or elemental range set forth herein.

The alloys of this invention are characterized by high temperature strengths, significantly higher than most other known cast aluminum alloys, together with an incipient melting point as high as about 550° C. For example, a casting made from this composition retains an ultimate tensile/yield strength of about 10.4/8.1 ksi and modulus of about 5.4 msi at about 700° F., and a tensile/yield strength of about 3.8/2.0 ksi and modulus of about 3.9 msi at about 900° F. Such properties make this alloy a potential candidate for the frame of a vehicular disk brake rotor onto which an abrasion surface may be coated.

The cast alloy composition of this invention is substantially copper-free and lithium-free. It is believed that its major strengthening phases are $NiAl_3$, $Mg_2Si$ and other high temperature intermetallics that are stable over 700° F.

Having described the presently preferred embodiments, it is to be understood that this invention may be otherwise embodied in the scope of the claims appended hereto.

What is claimed is:

1. An improved aluminum alloy suitable for high temperature castings, said alloy being copper-free and consisting essentially of: about 12–22 wt % silicon, about 2.5–4.5 wt % nickel, about 0.2–0.6 wt % magnesium, up to about 1.2 wt % manganese, up to about 1.2 wt % iron, and about 0.005–0.015 wt % phosphorus, the balance aluminum, incidental elements and impurities; wherein said aluminum alloy contains $NiAl_3$ and $Mg_2Si$ phases.

2. The alloy of claim 1 which contains about 13–19 wt % silicon.

3. The alloy of claim 2 which contains greater than about 15 wt % silicon.

4. The alloy of claim 1 which contains about 0.4–0.55 wt % magnesium.

5. The alloy of claim 1 which further contains up to about 0.25 wt % vanadium.

6. The alloy of claim 1 which further contains up to about 0.2 wt % zirconium.

7. The alloy of claim 1 which further contains up to about 0.25 wt % titanium.

8. The alloy of claim 1 which further contains up to about 2 wt % cerium and/or mischmetal.

9. A cast aluminum alloy which retains significant strength at temperatures of up to about 900° F., said alloy being copper-free and consisting essentially of: about 12–22 wt % silicon; about 2.5–4.5 wt % nickel; about 0.20–0.6 wt % magnesium; up to about 1.2 wt % manganese; up to about 1.2 wt % iron; about 0.005–0.03 wt % phosphorus; up to about 0.25 wt % vanadium; up to about 0.2 wt % zirconium; up to about 0.25 wt % titanium; and up to about 2 wt % cerium and/or mischmetal, the balance aluminum, incidental elements and impurities; wherein said aluminum alloy contains $NiAl_3$ and $Mg_2Si$ phases.

10. The alloy of claim 9 which contains about 13–19 wt % silicon.

11. The alloy of claim 10 which contains greater than about 15 wt % silicon.

12. The alloy of claim 9 which contains about 0.4–0.55 wt % magnesium.

13. A vehicular disk brake component, cast from a copper-free alloy consisting essentially of: about 12–22 wt % silicon; about 2.5–4.5 wt % nickel; about 0.2–0.6 wt % magnesium; up to about 1.2 wt % manganese; up to about 1.2 wt % iron; about 0.005–0.03 wt % phosphorus; up to about 0.25 wt % vanadium; up to about 0.2 wt % zirconium; up to about 0.25 wt % titanium; and up to about 2 wt % cerium and/or mischmetal, the balance aluminum, incidental elements and impurities; wherein said aluminum alloy contains $NiAl_3$ and $Mg_2Si$ phases.

14. The disk brake component of claim 13 which contains about 13–19 wt % silicon.

15. The disk brake component of claim 14 which contains greater than about 15 wt % silicon.

16. The disk brake component of claim 13 which contains about 0.4–0.55 wt % magnesium.

17. The disk brake component of claim 13 which is a brake rotor frame.

18. The disk brake component of claim 13 which is at least partially covered with an abrasion resistant coating.

* * * * *